United States Patent
Pop

(10) Patent No.: US 11,415,464 B2
(45) Date of Patent: Aug. 16, 2022

(54) INFRARED THERMAL MONITORING SYSTEM FOR INDUSTRIAL APPLICATION

(71) Applicant: ADVANCETREX SENSOR TECHNOLOGIES CORP., Walnut, CA (US)

(72) Inventor: Florin Emilian Pop, Morton Grove, IL (US)

(73) Assignee: Advancetrex Sensor Technologies Corp., Walnut, CA (US)

( * ) Notice: Subject to any disclaimer, the term of this patent is extended or adjusted under 35 U.S.C. 154(b) by 618 days.

(21) Appl. No.: 16/380,666

(22) Filed: Apr. 10, 2019

(65) Prior Publication Data

US 2019/0310137 A1 Oct. 10, 2019

Related U.S. Application Data

(60) Provisional application No. 62/655,785, filed on Apr. 10, 2018.

(51) Int. Cl.
| | |
|---|---|
| *G01J 5/00* | (2022.01) |
| *H04N 5/33* | (2006.01) |
| *H02B 13/065* | (2006.01) |
| *H04N 7/18* | (2006.01) |
| *H02H 6/00* | (2006.01) |

(Continued)

(52) U.S. Cl.
CPC ............ *G01J 5/0096* (2013.01); *G01J 5/03* (2022.01); *G06F 1/305* (2013.01); *H02B 13/065* (2013.01); *H02H 6/005* (2013.01); *H04L 12/66* (2013.01); *H04L 65/102* (2013.01); *H04N 5/332* (2013.01);

(Continued)

(58) Field of Classification Search
CPC .... G01J 5/0096; G01J 5/18; G01J 2005/0077; G01J 5/03; H02B 13/065; H04N 5/332; H04N 7/181; G06F 1/305; H04L 12/66; H04L 65/102; H02H 6/005
See application file for complete search history.

(56) References Cited

U.S. PATENT DOCUMENTS

| | | | |
|---|---|---|---|
| 2006/0062275 A1 * | 3/2006 | Teng ...................... | G01J 5/025 374/124 |
| 2010/0044567 A1 * | 2/2010 | Brandt .................. | G01J 5/0096 250/334 |

(Continued)

FOREIGN PATENT DOCUMENTS

WO WO-2017117674 A1 * 7/2017 ............. G08B 17/10

*Primary Examiner* — David P Porta
*Assistant Examiner* — Jeremy S Valentiner
(74) *Attorney, Agent, or Firm* — HoustonHogle LLP

(57) ABSTRACT

A thermal monitoring system includes thermal monitoring devices that generate sensor data including thermal images depicting monitored elements (e.g. of an electrical switchgear system). The sensor data for all monitoring devices installed at a local deployment is collected by a gateway device, and relevant data from multiple local deployments is further aggregated by a cloud management system for further analysis. New event triggering rules determining how the thermal monitoring devices filter or record the sensor data are generated based on the aggregated data during a continuous learning process. The system detects patterns in the sensor data for the monitoring devices and/or local deployments as a whole and tracks deviations from these patterns, improving the accuracy of the event detection over time.

26 Claims, 6 Drawing Sheets

(51) Int. Cl.
  *G06F 1/30*    (2006.01)
  *H04L 65/102*  (2022.01)
  *H04L 12/66*   (2006.01)
  *G01J 5/03*    (2022.01)

(52) U.S. Cl.
  CPC ...... *H04N 7/181* (2013.01); *G01J 2005/0077* (2013.01)

(56) References Cited

U.S. PATENT DOCUMENTS

2015/0296146 A1* 10/2015 Scanlon ................ H04N 5/247
                                                           348/82
2019/0158724 A1*  5/2019 Parrish ................. H04N 5/247
2019/0324431 A1* 10/2019 Cella ................... G06K 9/6263

\* cited by examiner

INFRARED THERMAL MONITORING SYSTEM FOR INDUSTRIAL APPLICATION

RELATED APPLICATIONS

This application claims the benefit under 35 USC 119(e) of U.S. Provisional Application No. 62/655,785, filed on Apr. 10, 2018, which is incorporated herein by reference in its entirety.

BACKGROUND OF THE INVENTION

High-voltage electrical switchgear is used to control, protect, and isolate electrical equipment providing power to premises such as office buildings, hospitals, warehouses, data centers, factories, retail establishments, shopping malls, schools, multi-unit dwellings, government buildings, and embassies, to name a few examples. Typically, in an enclosed building, the high-voltage switchgear is contained in one or more cabinets located in a secure electrical room. Depending on the voltage levels involved, the switchgear may also be located in an electrical substation or in an outdoor staging area. The high-voltage switchgear includes programmable logic controllers (PLC) configured to control one or more cabinets, and each cabinet may include high-voltage, high-current power conducting elements such as circuit breakers, fuses, switches, lightning arrestors and other components used to energize and de-energize the switchgear to allow work to be performed and clear faults downstream.

Maintenance of this electrical switchgear equipment involves ensuring that power elements (e.g. power bars, junctions, relays, contacts, transformers) stay within a specified thermal range in order to prevent thermal runway that can result in fires and create long term critical power outages.

SUMMARY OF THE INVENTION

Existing thermal monitoring systems for electrical switchgear present numerous problems. In some systems, sensors equipped with radio-frequency identification (RFID) tags installed on monitored junction screws and power elements transmit temperature information to reader devices. However, retrofitting older deployments with these systems is difficult and costly, requiring the power to be shut down. Additionally, the thermal area covered by these systems is limited. Another strategy involves a technician periodically inspecting the switchgear with a thermal camera. However, this approach is also costly, requiring certified technicians using expensive equipment, and real-time monitoring and prevention is not possible.

The presently disclosed thermal monitoring system involves a non-contact, cost effective sensor that can monitor real-time and historical temperature evolution of monitored elements (e.g. elements of electrical switchgear systems) and predict possible failures in the monitored systems. Local thermal monitoring devices equipped with thermal imaging sensors monitor elements of the electrical switchgear and communicate with a gateway device connected to a cloud management system. Over time, the thermal monitoring system even learns about the particular environments monitored by the thermal monitoring devices, pushing updated rules and event criteria to the thermal monitoring devices based on the particular environments.

Each of the thermal monitoring devices generate sensor data for a monitored element, and the sensor data for all monitoring devices installed at a local deployment is collected by a gateway device (e.g. over a DC power supply bus or via wireless communications). Relevant data (e.g. indicating an event based on predetermined and continually updated event criteria) will be stored in the gateway and might also be sent to the cloud management system for further analysis. The gateway device analyzes the sensor data and creates new event triggering rules during a self-training process based on data from the connected monitoring devices. In this way, the system detects patterns in the sensor data for the monitoring devices and/or local deployments as a whole and tracks deviations from these patterns, improving the accuracy of the event detection over time. By having a central gateway serving each local deployment of monitoring devices decreases costs by centralizing processing of the sensor data and/or event information (e.g. via deep learning) in the gateway device and/or at the cloud management system. As a result, the cost of the sensors can be scaled down significantly.

The gateway device might operate along with the cloud management system as previously described or independently. For example, if the gateway device does not have network connectivity with a cloud management system, the device can operate independently by processing the data from the different thermal monitoring devices and/or generating reports based on data gathered in a local context (e.g. for a single local deployment).

In general, according to one aspect, the invention features a thermal monitoring system for electrical switchgear cabinets. The thermal monitoring system includes monitoring devices and a gateway device. The monitoring devices generate sensor data for monitored elements of the electrical switchgear cabinets and detect events based on the sensor data (e.g. including evolution of the sensor data over time) and event triggering rules. During the pooling process, the gateway device collects the sensor data for the detected events, generates event information based on the sensor data, updates the event triggering rules based on the received data (e.g. sensor data history and context information such as measured grid parameters and grid state) and pushes the updated event triggering rules to the monitoring devices.

In embodiments, the monitored elements include circuit breakers, fuses, switches, lightning arrestors, power bars, junctions, relays, contacts, and/or transformers of the electrical switchgear cabinets.

The monitoring devices comprise cameras for generating thermal images representing infrared radiation of the monitored elements, and the event information includes images depicting visual features of the monitored elements overlaid on the thermal images. The cameras might comprise thermopile pixel arrays for generating temperature information for different regions within the field of view of the cameras, in which case the event triggering rules are updated based on changes to the temperature information for the different regions over time.

The updated event triggering rules could also be generated based on recognized features of the monitored elements depicted in captured image data. The monitoring devices would then generate targeted sensor data corresponding to the recognized features of the monitored elements based on the updated event triggering rules.

In one example, the thermal monitoring system comprises a cloud management system connected to gateway devices installed at a plurality of different premises via one or more public networks. The cloud management system receives aggregated event information and/or sensor data from the plurality of gateway devices, generates updated configuration settings for the gateway devices based on the aggregated event information and/or sensor data and pushes the updated configuration settings to the gateway devices. The plurality of gateway devices might exchange the event information and/or sensor data to the cloud management system by posting transactions containing the event information and/or sensor data to a distributed ledger and/or blockchain.

The monitoring devices might also comprise single-cell thermopiles for generating average temperature information in a power-saving mode or temperature detectors for generating ambient temperature information for an environment within and/or outside the electrical switchgear cabinets, in which case the monitoring devices detect the events based on the ambient temperature information. The gateway devices could also detect the events based on instantaneous power and/or current levels for the electrical switchgear cabinets.

The monitoring devices comprise circular buffers for temporarily storing the sensor data and send the sensor data for a period of time before the detected events to the gateway device. In this example, the monitoring devices might also comprise backup power sources providing sufficient power to store the sensor data from the circular buffers in nonvolatile memory in response to detecting power failures.

In general, according to another aspect, the invention features a method for monitoring elements of electrical switchgear cabinets. Monitoring devices generate sensor data for the monitored elements and detect events based on the sensor data and event triggering rules. Event information is then generated based on the sensor data. The event triggering rules are also updated based on the received sensor data, and the updated rules are pushed to the monitoring devices.

In general, according to another aspect, the invention features a thermal monitoring system/method for electrical switchgear cabinets. Monitoring devices generate sensor data for monitored elements of the electrical switchgear cabinets based on event triggering rules. A management system generates updated configuration settings for a gateway device based on the sensor data and pushes the updated configuration settings to the gateway device. In turn, the gateway device generates updated event triggering rules based on the updated configuration settings and pushing the updated event triggering rules to the monitoring devices.

In general, according to another aspect, the invention features a thermal monitoring system/method for electrical switchgear cabinets. Monitoring devices generate sensor data and identify relevant sensor data and irrelevant sensor data based on the sensor data and event triggering rules. A gateway device generates event information based on the relevant sensor data, and the irrelevant sensor data is discarded.

In general, according to another aspect, the invention features a thermal monitoring system/method for electrical switchgear cabinets. Monitoring devices generate sensor data for monitored elements of the electrical switchgear cabinets, detect events based on the sensor data, and generate thermal image data depicting the events. A gateway device receives the thermal image data from the monitoring devices and presents the thermal image data in animation via a display.

In general, according to another aspect, the invention features a thermal monitoring system/method for electrical switchgear cabinets. Monitoring devices generate sensor data for monitored elements of the electrical switchgear cabinets and detect events based on the sensor data. A gateway device generates event information based on the sensor data for the detected events, and a management system receives the event information from the gateway device and generates reports indicating preventive maintenance to be performed on the electrical switchgear cabinets.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
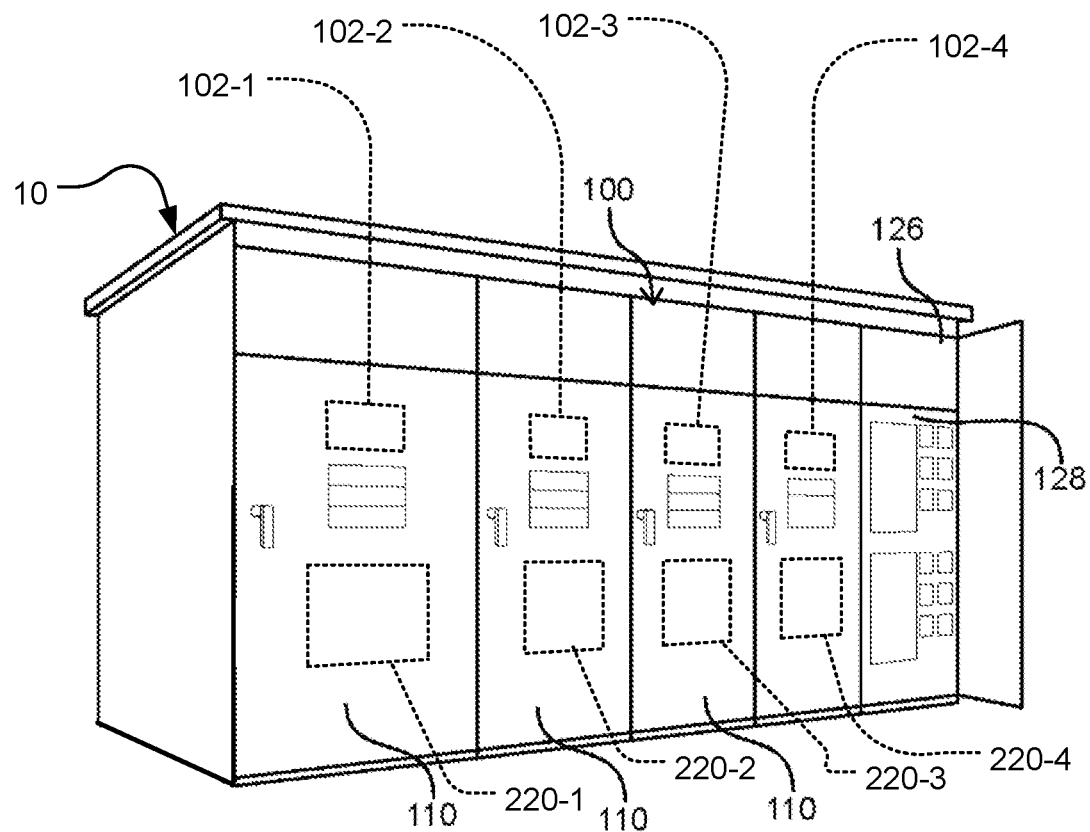
FIG. 1 is a perspective drawing of an electrical switchgear cabinet system to which the presently disclosed thermal monitoring system is applied, in one implementation.

FIG. 1 is a perspective drawing of an electrical switchgear cabinet system 10 with a thermal monitoring system 100 according to one embodiment of the present invention.

In general, the thermal monitoring system 100 is used to identify incipient thermal issues with the switchgear cabinet system 10 (e.g. oxidized contacts, defective equipment) in order to prevent fires due to excessive overheating.

The electrical switchgear cabinet system 10 includes one or more high-voltage switchgear cabinets 110, each having one or more high-voltage power conducting elements (e.g. circuit breakers, fuses, switches, lightning arrestors) disposed internal to the cabinet 110 and protected by a lockable door. Typically these high-voltage circuit breakers switch circuits operating above 1000 Volts (V) for alternating current, and at least 1500 V for direct current. However, the term "high-voltage" for the purposes of the presently disclosed system can be understood to include any voltage high enough to inflict harm on living organisms, typically including 600 V or greater.

A control cabinet 126 houses a control system 128, which may be a central programmable logic controller (PLC). The control system 128 may control one or many switchgear cabinets 110. For purposes of clarity only four switchgear cabinets 110 are shown, but any suitable number of switchgear cabinets may be included in the electrical switchgear system 100 depending upon the size of the installation and the particular application.

The thermal monitoring system 100 includes thermal monitoring devices 102, each of which is associated with and monitors a monitored element 220 of the electrical switchgear system 10. In one example, the monitored elements are power conducting elements 220 (e.g. circuit breakers, fuses, switches, lightning arrestors, power bars, junctions, relays, contacts, transformers) of the electrical switchgear system 10.

In the illustrated example, one thermal monitoring device 102 and one associated monitored element or set of monitored elements 220 is contained within each of the electrical switchgear cabinets 110.

Figure 2:
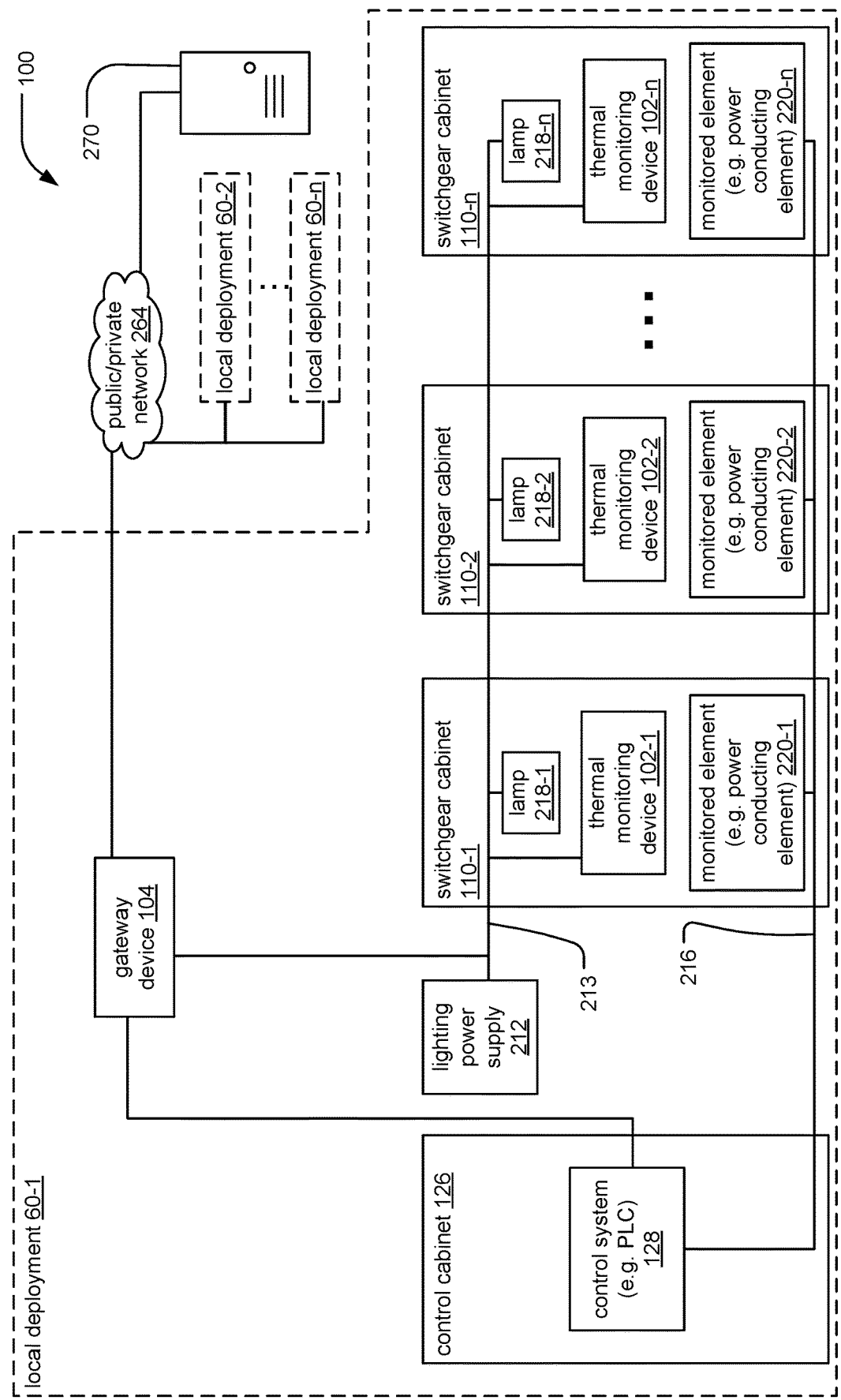
FIG. 2 is a schematic diagram of the thermal monitoring system according to one embodiment of the invention.

FIG. 2 is a schematic diagram of the thermal monitoring system 100 according to one embodiment of the invention.

The thermal monitoring system 100 includes gateway devices 104, thermal monitoring devices 102 and a cloud management system 270.

In general, the gateway devices 104 and thermal monitoring devices 102 are distributed at one or more local deployments 60, which represent different discrete electrical switchgear systems 10, for example, installed at different premises or buildings.

In one example, each local deployment 60 is a different location containing an electrical switchgear system 10 that is monitored by the thermal monitoring system 100. Each local deployment 60 includes a gateway device 104 and one to several thermal monitoring devices 102. The thermal monitoring devices 102 each monitor one or a set of the monitored elements 220 of the electrical switchgear system 10 located at the local deployment 60 and generate sensor data for the monitored elements 220. Each gateway device 104 communicates with all of the thermal monitoring devices 102 at the local deployment 60 where the gateway device 104 is installed. In turn, the cloud management system 270 communicates with all of the gateway devices 104 at all of the local deployments 60.

In the illustrated example, local deployments 60-1 through 60-n are shown connected to the cloud management system 270. However, for the sake of clarity, only the components of the thermal monitoring system 100 and the electrical switchgear system 10 for the first local deployment 60-1 are depicted.

As previously described with respect to FIG. 1, the control cabinet 126 of the electrical switchgear system 10 houses the control system 128, which controls the monitored power conducting elements 220 (e.g. circuit breakers, fuses, switches, lightning arrestors, power bars, junctions, relays, contacts, transformers) of the electrical switchgear cabinets 110 via a switchgear control/power circuit 216. The control cabinet 126 may further house various transformers that provide low voltages, e.g., 24 V DC, which is the preferred voltage level for the control system 128 and associated control signals. The 24 V DC signal may be provided by the control cabinet 126 to each high-voltage switchgear cabinet 110 in a daisy-chain manner from cabinet to cabinet using standard wiring. Use of 24 V DC control signaling is preferable because 24 V is sufficiently low so as not to present a shock hazard if inadvertently touched by a human, yet sufficiently high so as to be resistant to electrical noise and other induced or stray radiation. A battery backup system (not shown) may also provide the 24 V DC power to the components.

In parallel, a lighting power supply 212 provides power to a series of lamps 218 associated with each of the electrical switchgear cabinets 110 via a power and communication circuit 213. The power and communication circuit 213 includes one or more conductors (e.g. wires) for conducting electrical current to the lamps 218. In the illustrated example, the lighting power supply 212 is shown outside the control cabinet 126, but in other embodiments, the lighting power supply 212 is inside the control cabinet 126 and could even receive power from the control cabinet 126 (for example, from one of the previously mentioned transformers providing 24 V DC).

Each monitored element 220 is monitored by an associated thermal monitoring device 102, for example, located within the switchgear cabinet 110 where the monitored element 220 is located. The thermal monitoring devices 102 monitor the monitored elements 220 by generating sensor data for the monitored elements 220, detecting events based on the generated sensor data and event triggering rules. The thermal monitoring devices 102 broadcast the detected events by sending the sensor data associated with the events to the gateway device 104. The thermal monitoring devices 102 also send the sensor data to the gateway device 104 in response to instructions from the gateway device 104.

In examples, the sensor data generated by the thermal monitoring devices 102 includes captured still and/or streaming image data (e.g. thermal and/or visible image snapshots of the monitored elements 220 and/or supervised area), temperature information (e.g. average thermal value within fields of view of the device's cameras, cabinet temperature), battery status information, sensor health information, active event triggering rules, local control interface status information, alert messages and/or status information generated based on the sensor data, and time/date information (e.g. timestamps indicating when the sensor data was generated).

The thermal monitoring device 102 also detects the events based on historical and real time sensor data. For example, the thermal monitoring device 102 stores sensor data history relevant to particular features of the monitored elements 220 depicted in the image data and detects the events based on an evolution of the sensor data over time (e.g. a growing "blob" indicating a heat source expanding and/or growing in intensity).

The gateway device 104 pools and/or aggregates the sensor data received from all of the thermal monitoring devices 102.

The gateway device 104 also collects other relevant data available to the gateway device 104, including electrical parameters (e.g. instantaneous power, current) passing through the monitored elements 220 and/or the electrical switchgear system 10. The electrical parameters for the electrical switchgear system 10 are received by the gateway device 104, for example, via a direct, private network connection between the gateway device 104 and the control system 128 of the electrical switchgear system 10. In one example, the gateway 104 includes different, insulated ports for connecting to the control system 128 of the electrical switchgear system 100 and to the public and/or private network 264. The control system 128 also feeds relevant data with respect to the monitored elements 220 to the gateway device 104.

The gateway device 104 then performs a baseline analysis of the aggregated sensor data, correlating the data from different thermal monitoring devices 102 with the other relevant data available to the gateway device 104 including time information and/or the electrical parameter information from the control system 128. For example, the gateway device 104 detects events based on the electrical parameters for the electrical switchgear system 10 and/or the sensor data (e.g. based on predetermined numbers or sequences of alert messages received from the thermal monitoring devices 102), generates event information and/or reports for the events detected by the thermal monitoring devices 102 and/or the gateway device 104, and generates updated event triggering rules for the different thermal monitoring devices 102 and pushes the updated rules to the devices.

In one example, based on the received sensor data, the gateway 104 develops and pushes new filters and/or rules, dynamically modifying pattern detection models for each particular thermal monitoring device 102 on the network.

In another example, the gateway device 104 determines that the measured instantaneous power for different electrical switchgear cabinets 110 and/or monitored elements 220 differs (e.g. based on communication with the control system 128), and based upon this difference, request sensor data from the associated thermal monitoring devices 102 in order to determine if either of the monitored elements 220 detect heating in the cabinets 110.

The gateway 104 also sends timing data to all connected thermal monitoring devices 102 to synchronize the thermal monitoring devices 102 such that events detected by the different devices can be correlated with respect to each other. This synchronization is important, because, in many configurations, the communication network connecting the gateway device 104 and the thermal monitoring devices 102 is capable of only slow transmission rates, making it especially difficult (or impossible) for the thermal monitoring devices 102 to transmit sensor data to the gateway device 104 in real time. For the same reason, all data collected by the thermal monitoring devices 102 and/or the gateway device 104 is timestamped, allowing it to be correlated, for example.

Additionally, the gateway device 104 sends the event information, reports, and/or sensor data to the cloud management system 270 to be stored. Preferably, all communications between the gateway device 104 and the cloud management system 270, by virtue of being transmitted over one or more public and/or private networks 264, are validated. In one example, the gateway device 104 posts the event information, reports and/or sensor data as transactions in a distributed ledger or blockchain, preventing the data from being replicated or modified by other entities and/or preventing "ghost" gateway devices 104 in the network.

In the illustrated embodiment, the gateway device 104 and thermal monitoring devices 102 communicate and receive power from the lighting power supply 212 via the power and communication circuit 213. In one embodiment, the gateway device 104 communicates with the thermal monitoring devices 102 using a non-restricted topology protocol such as LonWorks networking platform by Echelon. In one example, a legacy electrical switchgear system 10 is updated with a retrofit thermal monitoring system 100 by connecting the thermal monitoring devices 102 and the gateway 104 to an existing lighting power circuit, which functions as the power and communication circuit 213 for the devices 102, 104. In another embodiment, one or more of the thermal monitoring devices 102 are equipped with wireless interfaces for communicating with the gateway device 104.

The gateway device 104 for each local deployment 60-1 through 60-$n$ connect to the cloud management system 270 via a public and/or private network 264, such as the internet or a private wide area network, among other examples.

The cloud management system 270 is, for example, a server system including one or more computing devices comprising memory and processors that is implemented as a cloud system (e.g. accessible only via one or more public networks). It can be run on a proprietary cloud system or implemented on one of the popular cloud systems operated by vendors such as Alphabet Inc., Amazon, Inc. (AWS), or Microsoft Corporation. In some cases, cloud management system 270 is one or more dedicated servers. In other examples, they are virtual servers. In general, the cloud management system 270 includes a database and/or one or more software processes stored in memory and executing on the processors of the one or more computing devices. In general, the cloud management system 270 receives and stores aggregated event information and/or sensor data from one or more gateway devices 104 (e.g. at different local deployments 60). The cloud management system 270 analyzes the aggregated event information and/or sensor data and, based on the analyses, generates updated configuration settings for the gateway devices 104 at different local deployments 60 (e.g. learning or training models including more sophisticated instructions for the gateway devices 104 in generating the updated event triggering rules, for example, setting particular areas of interest for the different thermal monitoring devices 102). The updated configuration settings are used, for example, by the gateway devices 104 in generating the updated event triggering rules distributed to the thermal monitoring devices 102. The cloud management system 270 also generates reports based on the aggregated event information and/or sensor data from all local deployments 60 and based on user input and customization settings. The cloud monitoring system 270 also synchronizes timing across the different gateway devices 104 at different local deployments 60, allowing the event information, sensor data and/or reports generated for the different deployments 60 to be correlated, for example.

For example, the cloud management system 270 generates reports including the event information and/or sensor data, including, for example, thermal images of monitored elements 220 with visible/near-IR images overlaid on the thermal images. These reports are presented to users of the thermal monitoring system 100, stored to be analyzed by users at a later time to determine whether preventive maintenance is necessary, and/or used as reference data for training a deep learning engine executing on the gateway device 104 and/or on the cloud management system 270.

In one example, the cloud management system 270 automatically generates a report based on the aggregated event information and/or sensor data from the different local deployments 60, the report identifying events and/or abnormal monitored conditions detected via the thermal monitoring devices 102 which potentially indicate that preventive maintenance is required. The set of identified events/conditions potentially indicate preventive maintenance is generated by the cloud management system 270 based, for example, on correlating the aggregated event information and/or sensor data with stored maintenance records.

The gateway device 104 and/or the cloud management system 270 also generate and use the thermal, visible/NIR and/or combined thermal/visible (wherein the visible/NIR images are overlaid on the thermal images) image data depicting the monitored elements 220 to perform calibration processes. For example, the gateway device 104 and/or the cloud management system 270 recognize features of the monitored elements 220 depicted in the images (e.g. via image analytics processing), generates a baseline temperature model for each thermal monitoring device 102 indicating normal thermal ranges for the different recognized features, and/or generates a position model indicating regions of the images (e.g. corresponding to particular portions of the field of view and/or pixels of the cameras 310, 312) that depict the recognized features of the monitored elements 220. In the latter example, the cloud management system 270 uses the position model to generate event triggering rules and/or learning models for the gateway device 104 and thermal monitoring devices 102 targeting the specific recognized features of the monitored elements 220 depicted in the image data.

In another example, a maintenance team analyzes reports generated by the cloud management system 270 and/or gateway device 104 including trend analytics and a collection of relevant thermal maps of in-field-of-view images in order to determine whether preventive maintenance is necessary.

Although the cloud management system 270 is depicted in the illustrated embodiment, it is not required, and embodiments of the thermal monitoring system 100 can function without being connected to the cloud management system 270.

In the illustrated embodiment, the thermal monitoring system 100 includes the cloud management system 270. However, it should be noted that the gateway device 104 is capable of operating independently. In one example (including the illustrated embodiment), if the gateway device 104 loses network connectivity with the cloud management system 270, the gateway device 104 nonetheless operates independently by processing the sensor data from the different thermal monitoring devices 102 and/or generating reports based on data gathered in a local context (e.g. for a single local deployment 60). In a similar example, the gateway device 104 only intermittently communicates with the cloud management system 270 (e.g. during scheduled maintenance periods) but otherwise operates independently. In another example (not illustrated), the thermal monitoring system 100 does not include the cloud management system 270, and the gateway device 104 always operates independently.

Figure 3A:
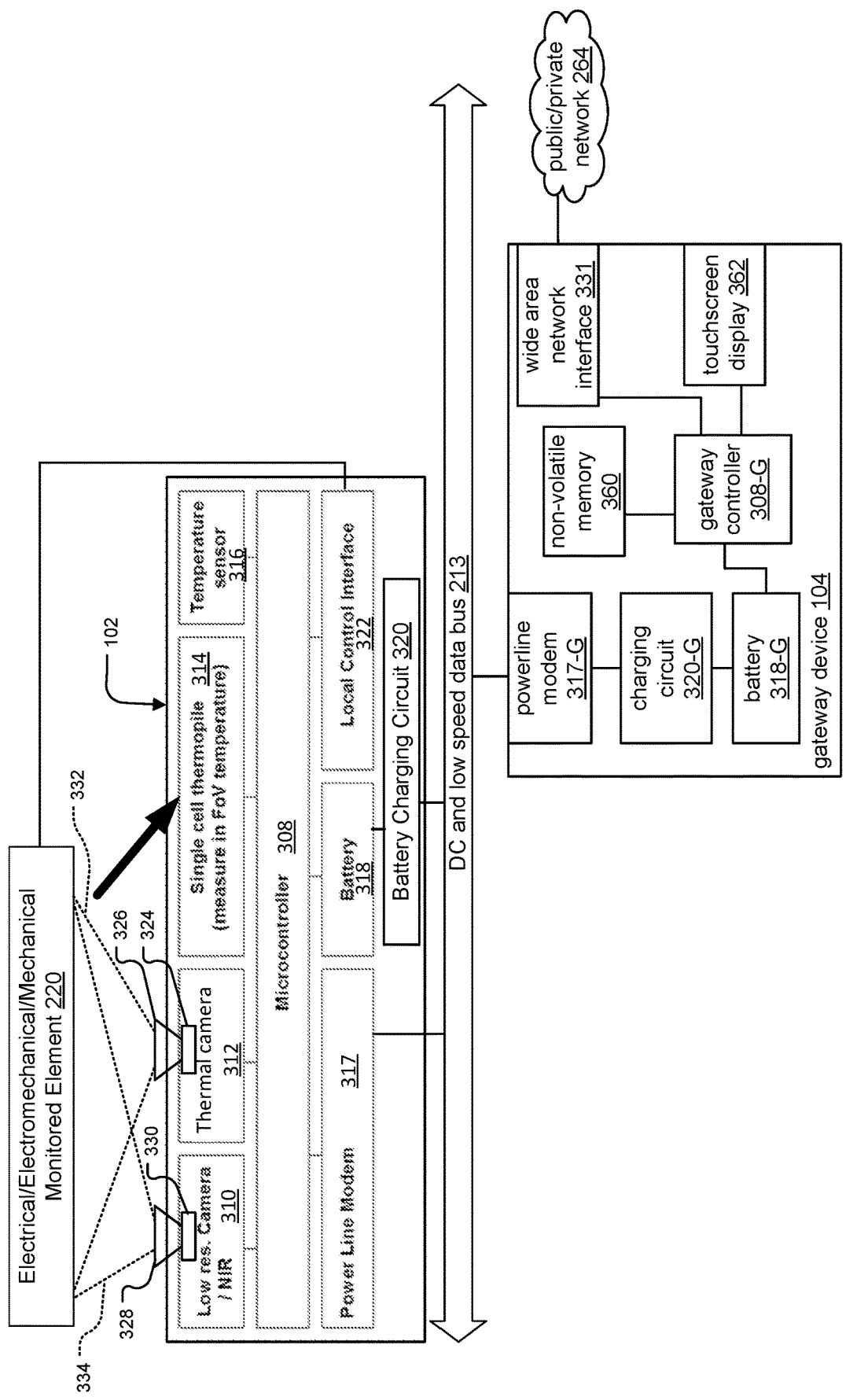
FIG. 3A is a schematic diagram of a thermal monitoring device and a gateway device of the thermal monitoring system according to one embodiment of the invention.

FIG. 3A is a schematic diagram of the thermal monitoring device 102 and the gateway device 104 according to one embodiment of the invention. Internal components of the two devices are shown in more detail.

The thermal monitoring device 102 includes a controller 308, a power line modem 316, a battery 318, a battery charging circuit 320, a local control interface 322, a low resolution camera 310, a thermal camera 312, a single cell thermopile 314, and a temperature sensor 316.

The power line modem 317 is a wired interface for communicating with the gateway device 104 and for powering the thermal monitoring device 102 via the power and communication circuit 213.

The battery charging circuit 320 stores power received via the power and communication circuit 213 in the battery 318, which provides backup power to the thermal monitoring device 102, for example, in the event of power failure. The thermal monitoring device 102 also includes, for example, a super capacitor, which is used to continue to provide sufficient energy to the device in order to store the circularly buffered sensor data in non-volatile memory in the case of a power failure. In this example, if the power outage is due to a critical event the data can later be retrieved and analyzed.

The thermal camera 312 or thermographic camera detects photons in the thermal wavelengths, such as 9-14 μm, and generates image data based on the detected long infrared (LIR) radiation. The thermal camera 312 includes a thermal lens element 326, comprising a lens or lens assembly, which directs the IR radiation for objects (e.g. the monitored element 220) or environment within a field of view 332 of the thermal camera 322 onto a thermal detection element 324 including a two dimensional thermopile array (e.g. 8×8 or 16×16 thermopile array) for converting the LIR energy into thermal image data. The thermal camera 312 converts the captured LIR energy into an electronic signal and then processes the signal to produce a thermal or heat zone image depicting, for example, LIR radiation levels for the objects or environment within the field of view 332 of the thermal camera 312. The thermal image of an object is an image representation of LIR energy emitted from that object. The higher the object's temperature, the greater the LIR radiation emitted. Usually, hotter areas or "hotspots" within the thermal image typically appear very bright, while cooler areas that emit lesser amounts of LIR energy appear darker in the image. The thermal images generated via the thermal camera 312 are analyzed by the thermal monitoring device 102, gateway device 104, and/or cloud management system 270, for example, to determine thermal evolution at each pixel or thermopile indicating an event.

The low-resolution camera 310 captures visible light and/or near-infrared (NIR) radiation in the visible and NIR wavelengths, such as 380-2500 nm, via a lens element 328 comprising a lens or lens assembly which directs the visible light and NIR radiation reflected off of objects and/or environmental features within a field of view 334 of the low-resolution camera 310 onto a visible light detection element 330, such as a CCD or CMOS image sensor. The low-resolution camera 310 generates image data depicting the objects and/or environmental features in the field of view 334 based on the captured light. In one embodiment, the low-resolution camera 310 includes an illuminator, which emits NIR radiation into the field of view 334, which is then reflected and captured, producing image data including a visual representation of the objects within the field of view (e.g. visible features of the monitored element 220).

The thermal camera 312 and the low-resolution camera 310 are positioned such that the fields of view 334, 332 of the two cameras overlap or coincide. The cloud management system 270 and/or the gateway device 104 also create hybrid images by overlaying the image data generated by the low-resolution camera 310 depicting the visual features of the monitored elements 220 onto the thermal images generated by the thermal camera 312, allowing technicians or other users to identify the monitored elements 220 and/or features of the monitored elements 220. The hybrid, hyperspectral images are also stored by the cloud management system 270 in some embodiments, presented on displays by the thermal monitoring devices 102 and the gateway device 104 and/or are processed locally by the gateway device 104 and/or thermal monitoring devices 102 to automatically calibrate the thermal monitoring devices 102, identify dangerous trends, generate new event triggering rules, and/or fed to a deep learning engine executing on the gateway 104 or cloud management system 270 as a reference image, among other examples.

The single cell thermopile 314 detects IR radiation from the same fields of view 332, 334 as the thermal camera 312 and the low-resolution camera 310 and is used by the thermal monitoring device 102, for example, to determine an average temperature for all objects within the field of view. The average temperature is used as a parameter for detecting the events based on the event triggering rules. In one example, the thermal monitoring device 102 uses the single cell thermopile 314 to save power during normal operation in a power saving mode. In this example, in response to determining that the average temperature determined via the single cell thermopile 314 is above a predetermined threshold specified via the event triggering rules, the thermal monitoring device 102 begins generating the thermal and/or visible image data via the thermal camera 312 and low-resolution camera 310 but otherwise does not continuously run the cameras 310, 312. In another example, the average temperature determined via the single cell thermopile 314 is compared to a reference temperature for the environment (e.g. generated via the temperature sensor 316 of the thermal monitoring device 102 or a networked temperature sensor located outside the electrical switchgear cabinet 110) in order to detect events based on the event triggering rules.

In some embodiments, other thermal sensors (e.g. radio-frequency identification (RFID) thermal sensors) are also installed on electrical elements such as buses, junctions, contactors and other devices that generate heat in order to provide more exact temperature detection and/or to compensate for errors caused by the distance between the thermal camera 312 and the monitored element 220.

In general, the controller 308 directs functionality of the thermal monitoring device 102, for example, by executing firmware and/or software instructions. In one example, the controller 308 is a small single-board computer. In other examples, the controller 308 is a microcontroller unit or a system on a chip (SoC), including one or more processor cores along with memory and programmable input/output peripherals such as analog to digital converts and digital to analog converters. More specifically, the controller 308 drives the low resolution camera 310, thermal camera 312, single cell thermopile 314, and temperature sensor 316, for example, by executing glue logic between these sensor elements in order to generate sensor data for the monitored element 220. The controller 308 also detects events and sends the sensor data for the detected events to a gateway device 104 of the thermal monitoring system 100 based on a set of event triggering rules or filters, for example, that were previously pushed to the thermal monitoring device 102 by the gateway device 104.

In general, the event triggering rules are criteria used by the thermal monitoring devices 102 and/or gateway devices 104 to detect events and/or determine whether to send or request sensor data. The event triggering rules include relatively simple events such as determining that the difference between an average temperature of objects depicted in the field of view of the thermal monitoring device 102 and the ambient temperature inside or outside the cabinet 110 exceeds a predetermined threshold, rate of growth of a difference between maximum heat detected by a pixel and minimum heat detected by a pixel is above a predetermined threshold, and/or a "blob" (e.g. region of a thermal image representing a source of heat) with a higher temperature than the minimum heat detected by a pixel is determined to have grown, among other examples. More complex triggering events include determining that trends for temperatures detected by specific pixels deviate from a projected path, among other examples. Over time, the event triggering rules used by the thermal monitoring devices 102 and/or the gateway device 104 are updated to make the thermal monitoring devices 102 more responsive to specific stimuli that indicate a possible system fault.

The simpler event triggering rules are defined by default and always used by the thermal monitoring devices 102 to detect events. As previously mentioned, these event triggering rules, which include threshold constants (e.g. defining safe parameters for sensor data and/or detected rates of growth, for example) are dynamically updated and pushed to the monitoring devices by the gateway device 104 based on network conditions (e.g. a particular threshold varies when the bus load varies) and/or other factors, in order to improve detection accuracy and overall effectiveness of the thermal monitoring system 100. On the other hand, the more complex rules, based on advanced trend analysis from multiple thermal monitoring devices 102 from multiple local deployments 60 and other relevant data, are used by the gateway device 104 and/or the cloud management system 270.

In one example, in response to detecting an event (e.g. via the simpler event triggering rules) the thermal monitoring device 102 automatically sends the current sensor data to the gateway device 104.

In another example, in response to detecting an event, the thermal monitoring device 102 alerts the gateway device 104 to the event, and the gateway device 104 requests the sensor data from the thermal monitoring device 102 in response to receiving a predefined number or sequence of event alerts from the thermal monitoring devices 102.

In another example, the gateway device 104 simply requests the sensor data independent of the event triggering rules.

In one embodiment, the controller 308 of the thermal monitoring device 102 functions as a filter for the generated sensor data. For example, the controller 308 simply parses the sensor data and determines whether to relay the data to the gateway 104 based on the event triggering rules (e.g. changes to the sensor data indicating a possible problem or in response to a request from the gateway 104), allowing the thermal monitoring device 102 to have a less expensive and/or resource-consuming controller 308 with relatively limited processing capacity (e.g. compared to that of the gateway device 104 and/or the cloud management system 270). Here, the controller 308 includes a circular buffer (e.g. including volatile memory) in which the sensor data is temporarily stored. According to this embodiment, the controller 308 of the thermal monitoring device 102 continuously generates and buffers the sensor data by storing it in the circular buffer volatile memory (for example, by overwriting the newly generated sensor data on the oldest stored sensor data) and executes simple filtering algorithms (e.g. enforcing the simpler event triggering rules) in order to detect the events and store the sensor data relevant to the detected events to nonvolatile memory (e.g. of the controller 308) and/or send the relevant sensor data (which includes leading and/or trailing sensor data generated for a predetermined period of time before and/or after the detected event) to the gateway device 104. The sensor data in the circular buffer that is not determined to be relevant, not stored in non-volatile memory, and/or not transmitted to the gateway device 104 is discarded or overwritten by newly generated sensor data.

In response to receiving the sensor data, the gateway device 104 stores the sensor data, requests more sensor data that it determines to be relevant and/or generates new rules for the thermal monitoring devices 102, for example, focusing the devices on collecting targeted sensor data pertaining to particular recognized visual features of the monitored elements 220 depicted in the image data. As a result, the gateway device 104 can direct tens or hundreds of thermal monitoring devices 102 over a slow communication channel in free topology. In this way, the disclosed system provides easy retrofitting to legacy electrical switchgear systems 10.

The local control interface 322 is an input/output module including, for example, general purpose input/output (GPIO) mechanisms allowing interaction between the thermal monitoring device 102 and external components. In one example, the thermal monitoring device 102 signals or controls the monitored element 220 and/or control system 128 of the electrical switchgear system 10 in cases where the thermal monitoring device 102, determines that a dangerous situation exists (e.g. thermal runaway) based on the sensor data by sending commands, changing state (e.g. to an alarm state, triggering a local alarm) via the local control interface 322. In another example, the local control interface 322 includes a display (e.g. liquid crystal display (LCD)) for presenting the sensor data including runtime measured parameters and/or hyperspectral image data (wherein the visible/NIR image data is overlaid on the thermal image data) for review by a technician during inspection and/or maintenance.

Similar to the thermal monitoring device 102, the gateway device 104 includes a controller 308-G, a powerline modem 317-G, charging circuit 320-G and battery 318-G, all of which are analogous to the corresponding components of the thermal monitoring device 102 and perform the same functionality except as noted.

Specifically, the gateway controller 308-G executes processes for analyzing the sensor data received from all of the connected thermal monitoring devices 102 as well as other information available to the gateway device 104 and, based on these analyses, generating event information and updating the event triggering rules for the different thermal monitoring devices 102.

In one example, the gateway controller 308-G executes a deep learning engine, which adjusts simple event triggering rules (e.g. used by default during an initial learning period or generated during a baseline analysis by the gateway device 104) used by the thermal monitoring devices 102 or to generate and enforce additional complex rules. The gateway 104 is fed reference data including configuration data (e.g. learning models generated by the cloud management system 270), sensor data captured by the thermal monitoring devices 102, and relevant data pertaining to the electrical switchgear system 10 from the control system 128, among other examples.

In another example, the gateway controller 308-G executes third party applications that collect and process the sensor data, for example, via secure virtualization methods such as containers).

Additionally, the gateway device 104 also includes a wide area network interface 331, non-volatile memory 360, and a touchscreen display 362.

The wide area network interface 331 provides network connectivity, for example, to the public and/or private network 264.

The wide area network interface 331 provides network connectivity, for example, to the public and/or private network 264.

The non-volatile memory 360 is an embedded or removable storage medium for storing the sensor data, event information, and/or other information pertaining to the thermal monitoring system 100 and/or electrical switchgear system 10. In embodiments, the non-volatile memory 360 is an embedded MultiMediaCard (eMMC) or a solid state drive (SSD).

The gateway device 104 presents the generated reports, event information and/or sensor data to users of the thermal monitoring system 100 via the touchscreen display 362, including presenting archived and/or live image data generated by the thermal monitoring devices 102, among other examples.

In one example, the gateway device 104 presents via the touchscreen display 362 the visible/NIR image data and receives input (e.g. from a technician during a configuration process) identifying features of the monitored components 220 and/or zones of interest in the field of view of the cameras 310, 312 (and thus depicted in the image data), which is used by the gateway device 104 during self-calibration processes to generate event triggering rules directing the thermal monitoring devices 102 to focus on the identified features and/or zones of interest.

In another example, the gateway device 104 presents via the touchscreen display 362 the hyperspectral image data (wherein the visible/NIR image data is overlaid on the thermal image data) in animation. The animation shows, for example, visible features of the monitored elements 220 with regions of different colors indicating different thermal attributes of the depicted visible features (e.g. thermal blobs representing sources of heat) over time. For example, during progression of the animation, the visible features of the monitored elements 220 are shown as static, while the thermal blobs change in size, indicating changes in the thermal attributes of the features of the monitored elements 220. Graphical elements are also overlaid on the image data. The graphical elements include, for example, information pertinent to specific frames of the animation including time/date information and measured parameters. The information indicated by the graphical elements changes along with the animation.

Figure 3B:
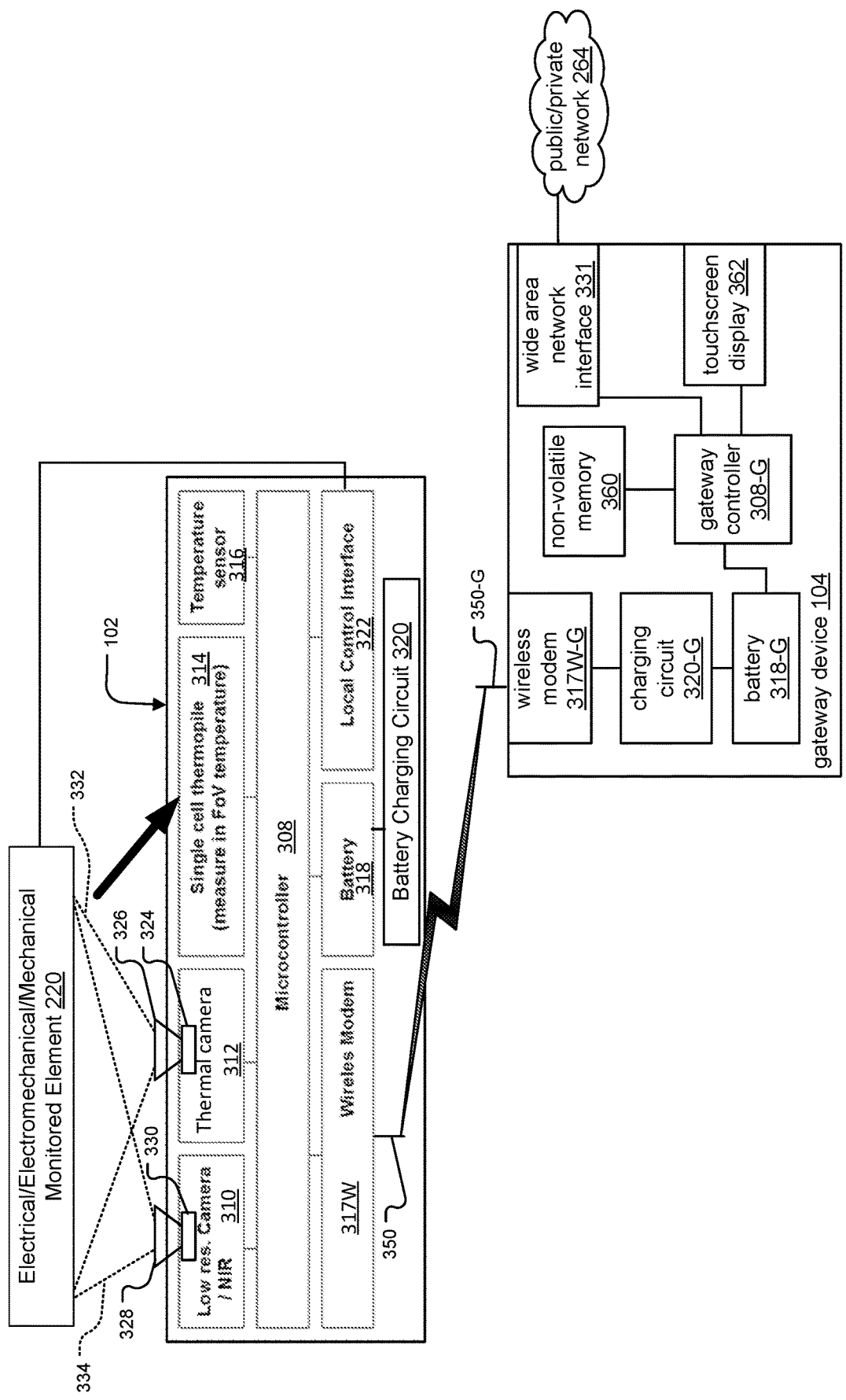
FIG. 3B is a schematic diagram of the thermal monitoring device and gateway device according to another embodiment of the invention.

FIG. 3B is a schematic diagram of the thermal monitoring device 102 and the gateway device 104 according to another embodiment of the invention.

In the illustrated example, the thermal monitoring device 102 and the gateway device 104 are similar to the devices previously described with respect to FIG. 2.

Now, however, both the thermal monitoring device 102 and the gateway device 104 include wireless modems or interfaces, including antennas 350, for communicating via wireless communication links.

In the illustrated example, the thermal monitoring device 102 is primarily powered by the battery 318, providing additional portability.

Figure 4:
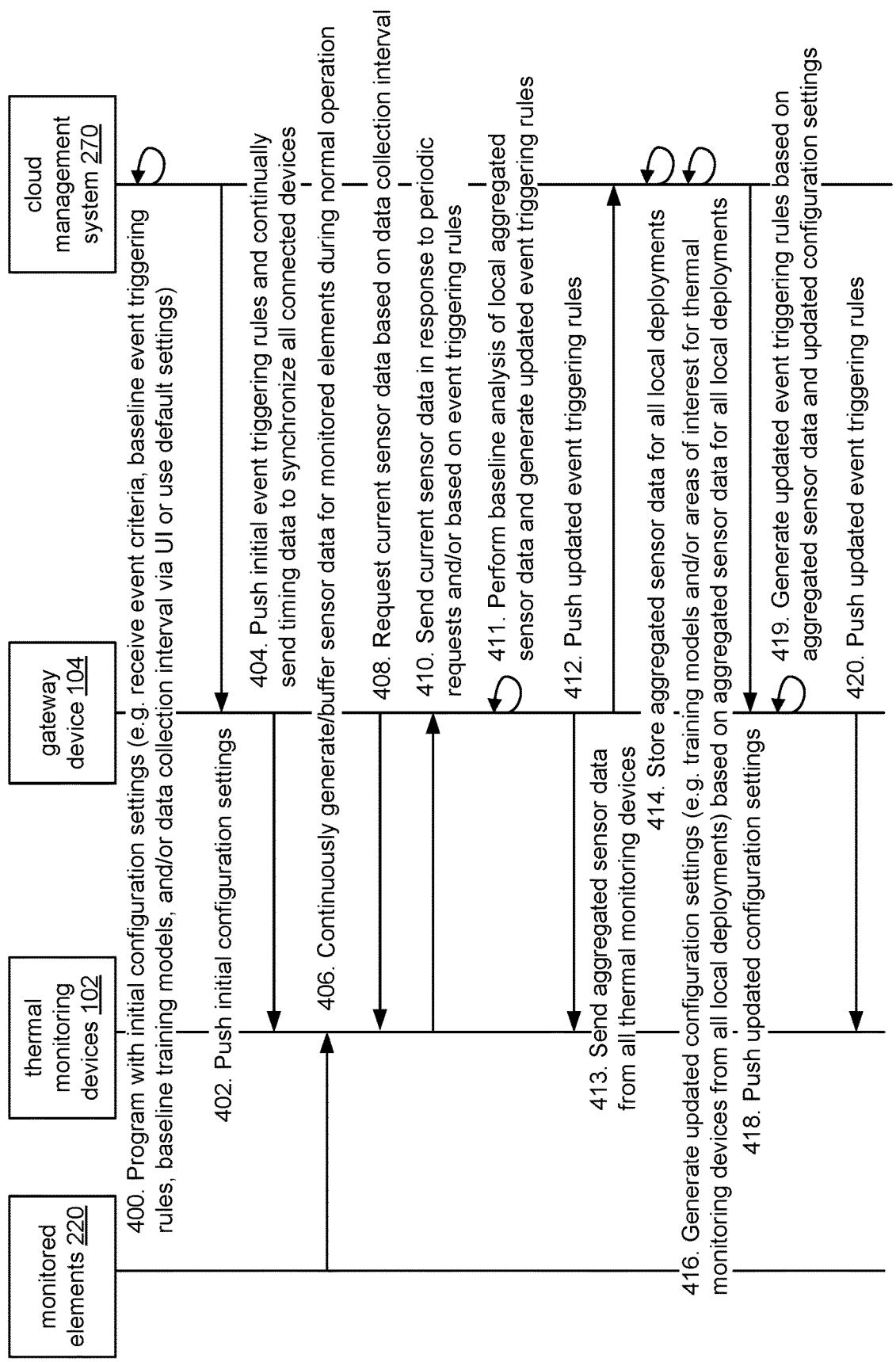
FIG. 4 is a sequence diagram illustrating an exemplary process by which the thermal monitoring system learns and improves event triggering rules for the thermal monitoring devices.

FIG. 4 is a sequence diagram illustrating an exemplary process by which the thermal monitoring system 100 learns and improves the event triggering rules for the thermal monitoring devices 102.

First, in step 400, the cloud management system 270 is programmed with initial configuration settings. In examples, the cloud management system 270 receives input via a user interface (UI) indicating event triggering rules, event detection criteria, baseline training models, and/or a baseline data collection interval indicating how often to request sensor data, for example, during an initial learning phase. In another embodiment (not illustrated), the gateway device 104 is programmed directly with the configuration settings, for example, based on input received via a GUI rendered on the touchscreen display 362. In step 402, the cloud management system pushes the initial configuration settings to the gateway device 104.

In step 404, the gateway device 104 configures the thermal monitoring devices 102. In one example, the gateway device 104 pushes the initial configuration settings to the thermal monitoring devices 102. In another example, the gateway device 104 continually sends timing data to the thermal monitoring devices 102 in order to synchronize the devices.

In another example, the gateway device 104 configures the thermal monitoring devices 102 by scanning the power and communication circuit 213 for responsive thermal monitoring devices 102 and building a map of the devices based on received responses. In general, the gateway 104 configures the communication network, including everything regarding its distribution topology such as whether cabinets 110 are chained together (e.g. providing power to other cabinets 110) via a gateway inference process. This information is used to communicate with the thermal monitoring devices 102 and to detect events. For example, if the temperature on one cabinet rises without having a temperature increase on a second cabinet, the fact that the cabinets 110 are connected are factored into the gateway device's 104 analysis.

In step 406, the thermal monitoring devices 102 continuously generate and buffer sensor data for the monitored elements 202 (e.g. via the thermal camera 312, low-resolution camera 310, single cell thermopile 314, temperature sensor 316) during normal operation of the thermal monitoring system 100.

In step 408, the gateway device 104 requests the current sensor data from the thermal monitoring devices 102 at periodic intervals based on the data collection interval in order gather reference data during the initial learning phase. In another example, the gateway device 104 requests the current sensor data in response to receiving and analyzing alerts and/or status information from the thermal monitoring devices 102.

In step 410, the thermal monitoring devices 102, either in response to the requests from the gateway device 104 or based on the simple event triggering rules, sends the current buffered sensor data to the gateway device 104.

In step 411, the gateway device 104 performs a baseline analysis of the aggregated sensor data from all of the thermal monitoring devices 102 installed at the local deployment 60 where the gateway device 104 is located and generates updated event triggering rules based on the analysis. These updated event triggering rules are then pushed from the gateway devices 104 to the thermal monitoring devices 102 in step 412.

In addition, in step 413, the gateway device 104 sends the aggregated sensor data to the cloud management system 270.

In step 414, the cloud management system 270 stores the aggregated sensor data received from all of the different gateway devices 104 at all of the different local deployments 60 and, in step 416, generates updated configuration settings for the gateway devices 104 at different local deployments 60, including, for example, updated deep learning or training models (e.g. with more sophisticated instructions for the gateway devices 104 in generating the updated event triggering rules) and designated areas of interest for the different thermal monitoring devices 102 (e.g. portions of image data associated with specific pixels and/or portions of the field of view to focus on). The designated areas of interest for the thermal monitoring devices 102 are generated by the cloud management system 100 based on the thermal and/or visible/NIR image data received from all of the thermal monitoring devices 102. In one example, the cloud management system 270 recognize features of the monitored elements 220 depicted in the image data (e.g. via image analytics processing), generates a position model indicating regions of the images (e.g. corresponding to particular portions of the field of view and/or pixels of the cameras 310, 312) that depict the recognized features of the monitored elements 220 and further generates the updated training models, for example, to indicate relationships between the regions of the images, pixels of the cameras 310, 312 and known features of the monitored elements 220. In step 418, the cloud management system 270 pushes these updated configuration settings (e.g. updated training models and/or areas of interest) to the gateway devices 104 at the different local deployments 60.

In step 419, the gateway device 104 generates updated event triggering rules based on the aggregated sensor data as well as the updated configuration settings from the cloud management system 270. For example, these updated event triggering rules might direct the thermal monitoring devices 102 detect events based only on sensor data generated with respect to particular features of the monitored elements 220 (depicted in particular regions of the image data, visible in particular portions of the fields of view and/or captured by particular pixels of the cameras). In step 422, the gateway device 104 pushes to the thermal monitoring devices 102 the updated event triggering rules generated by the gateway device 104 based on the updated configuration settings from the cloud management system 270. In one example, the gateway device 104 first validates and evaluates new features indicated by the updated configuration settings before generating and pushing the updated event triggering rules.

It should be noted that, although the illustrated example shows an initial learning phase in which the sensor data is generated and transmitted to the gateway 104 at regular intervals, this process repeats indefinitely during normal operation of the thermal monitoring system 100, as the sensor data generated by the thermal monitoring devices 102 and transmitted to the gateway device 104 based on the current event triggering rules is used to generate even more refined updated event triggering rules.

Figure 5:
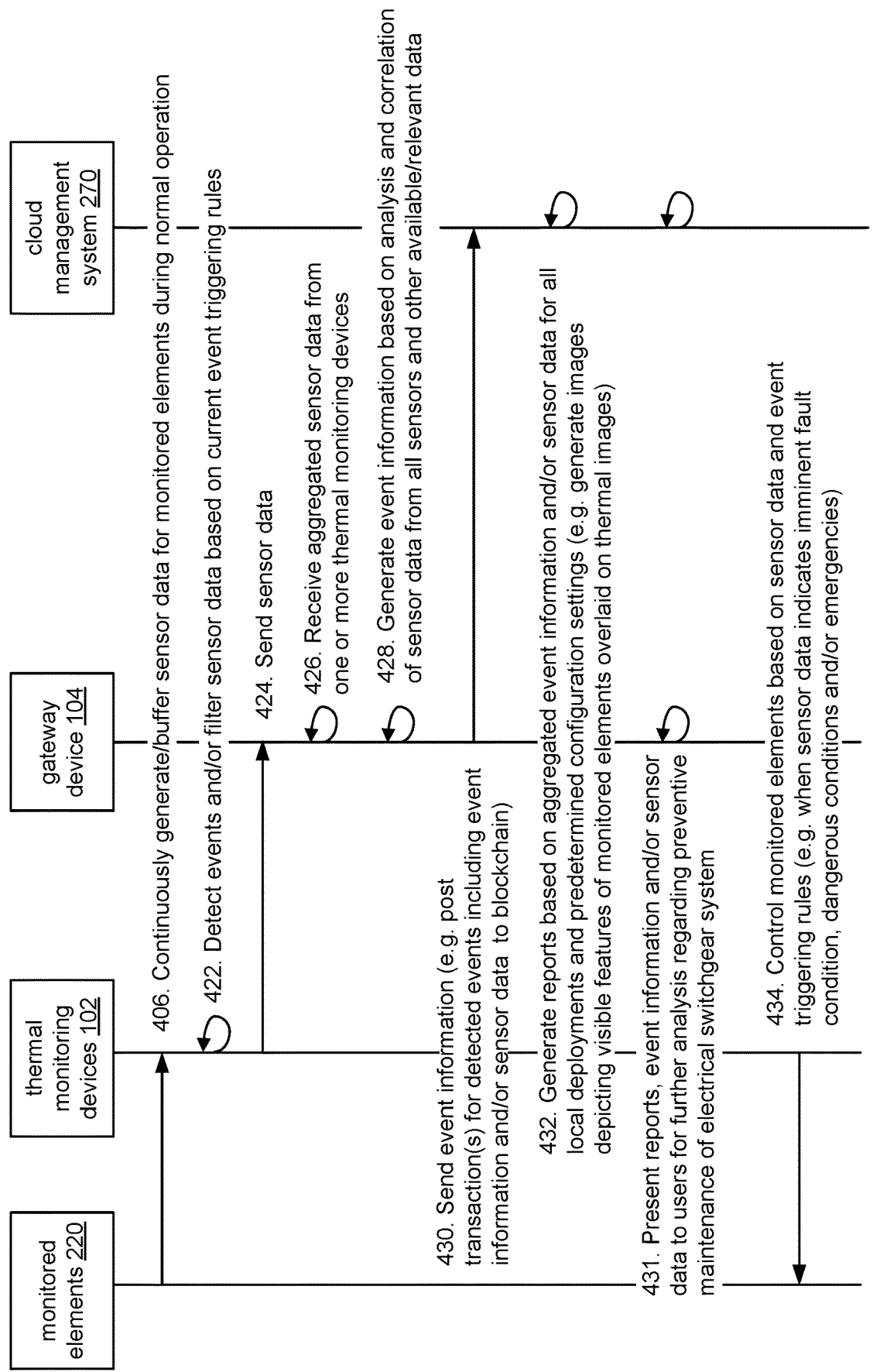
FIG. 5 is a sequence diagram illustrating an exemplary process by which the thermal monitoring system generates and stores reports and/or event information.

FIG. 5 is a sequence diagram illustrating an exemplary process by which the thermal monitoring system 100 generates and stores reports and/or event information.

It should be noted that the process of learning and improving the event triggering rules and configuration data (previously described with respect to FIG. 4) can occur before, during and/or after the following process of monitoring the monitored components 220 and generating the reports and event information. In general, the learning process (e.g. steps 406 through 420) is performed during normal operation of the thermal monitoring system 100 (e.g. steps 422 through 434), with the sensor data generated, for example, during step 422 being used by the gateway device 104 to generate the updated event triggering rules in step 411 and also being used by the cloud management system 270 to generate the updated configuration data in step 416). However, for the purpose of clarity, only the process of monitoring the monitored elements 220 is shown in the illustrated example.

First, in step 406, the thermal monitoring devices 102 continuously generate and buffer sensor data for the monitored elements 220 during normal operation, as previously described.

In step 422, the thermal monitoring devices 102 detect events and/or filter the sensor data based on the current event triggering rules.

In step 424, the thermal monitoring devices 102, in response to detecting the events, send the sensor data to the gateway device 104. In another example, the thermal monitoring devices 102 simply alert the gateway device 104 to the detected event, and the gateway device 104 requests the sensor data, for example, in response to receiving alerts for a predetermined number and/or sequence of events.

In step 426, the gateway device 104 receives aggregated sensor data from one or more of the thermal monitoring devices 102 at the local deployment 60 where the gateway device 104 is located. In step 428, the gateway device 104 generates event information based on analysis and correlation of this aggregated sensor data from all of the thermal monitoring devices 102, including historical sensor data, as well as other information available to the gateway device 104 that is determined to be relevant. Here, the gateway device 104 also performs the baseline analysis of the aggregated data, generating the updated event triggering rules and pushing the updated rules to the thermal monitoring devices 102 as previously described in steps 411 and 412.

In step 430, the gateway device 104 sends the event information and/or sensor data to the cloud management system 270, for example, by posting transactions to a distributed ledger or blockchain, the transactions including the event information and/or sensor data.

In step 432, the cloud management system 270 generates reports based on the aggregated event information and/or the sensor data for all of the different local deployments 60 and based on customized report configuration settings and/or user input. In one example, the reports include images depicting visible features of the monitored elements 220 overlaid on thermal images showing heat emitted by the monitored elements 220 in positions corresponding to the depicted visual features. In addition, the cloud management system 270 generates the updated configuration settings based on the aggregated event information and/or the sensor data for all of the different local deployments 60 and pushes the updated configuration settings to the gateway devices 104, as previously described in steps 416 through 420.

In step 431, the cloud management system 270 and/or the gateway device 104 present the reports, event information and/or sensor data to users of the thermal monitoring system 100 for further analysis, for example, regarding preventive maintenance to be performed on the electrical switchgear system 10.

Finally, in step 434, the thermal monitoring devices 102 control the monitored elements 220, for example, by sending instructions to the monitored elements 220 and/or to the control system 128 of the electrical switchgear system 10, for example, in cases where the sensor data indicate an imminent fault condition and/or dangerous conditions or emergencies.

While this invention has been particularly shown and described with references to preferred embodiments thereof, it will be understood by those skilled in the art that various changes in form and details may be made therein without departing from the scope of the invention encompassed by the appended claims.

What is claimed is:

1. A thermal monitoring system for electrical switchgear cabinets, the thermal monitoring system comprising:
    monitoring devices for generating sensor data for monitored elements of the electrical switchgear cabinets and detecting events based on the sensor data and event triggering rules, wherein the monitoring devices are each installed in different cabinets; and
    a gateway device for receiving the sensor data for the detected events from the monitoring devices in the different cabinets, generating event information based on the sensor data, updating the event triggering rules based on the received sensor data, and pushing the updated event triggering rules to the monitoring devices.

2. The system as claimed in claim 1, wherein the monitored elements include circuit breakers, fuses, switches, lightning arrestors, power bars, junctions, relays, contacts, and/or transformers of the electrical switchgear cabinets.

3. The system as claimed in claim 1, wherein the monitoring devices comprise cameras for generating thermal images representing infrared radiation of the monitored elements.

4. The system as claimed in claim 3, wherein the event information includes images depicting visual features of the monitored elements overlaid on the thermal images.

5. The system as claimed in claim 3, wherein the cameras comprise thermopile pixel arrays for generating temperature information for different regions within the field of view of the cameras, and the event triggering rules are updated based on changes to the temperature information for the different regions over time.

6. The system as claimed in claim 1, wherein the updated event triggering rules are generated based on recognized features of the monitored elements depicted in captured image data, and the monitoring devices generate targeted sensor data corresponding to the recognized features of the monitored elements based on the updated event triggering rules.

7. The system as claimed in claim 1, further comprising the gateway device including multiple gateway devices and a cloud management system connected to the gateway devices installed at a plurality of different premises via one or more public networks, the cloud management system receiving aggregated event information and/or sensor data from the plurality of gateway devices, generating updated configuration settings for the gateway devices based on the aggregated event information and/or sensor data, and pushing the updated configuration settings to the gateway devices.

8. The system as claimed in claim 7, wherein the plurality of gateway devices send the event information and/or sensor data to the cloud management system by posting transactions containing the event information and/or sensor data to a distributed ledger and/or blockchain.

9. The system as claimed in claim 1, wherein the monitoring devices comprise single-cell thermopiles for generating average temperature information in a power-saving mode.

10. The system as claimed in claim 1, wherein the monitoring devices comprise temperature detectors for generating ambient temperature information for an environment within and/or outside the electrical switchgear cabinets, and the monitoring devices detect the events based on the ambient temperature information.

11. The system as claimed in claim 1, wherein the gateway device detects the events based on instantaneous power and/or current levels for the electrical switchgear cabinets.

12. The system as claimed in claim 1, wherein the monitoring devices comprise circular buffers for temporarily storing the sensor data, and the monitoring devices send the sensor data for a period of time before the detected event to the gateway device.

13. The system as claimed in claim 12, wherein the monitoring devices comprise backup power sources providing sufficient power to store the sensor data from the circular buffers in nonvolatile memory in response to detecting power failures.

14. A method for monitoring elements of electrical switchgear cabinets, the method comprising:
    installing monitoring devices in different cabinets;
    the monitoring devices generating sensor data for the monitored elements from the different cabinets and detecting events based on the sensor data and event triggering rules for the different cabinets;
    generating event information based on the sensor data;
    a gateway device updating the event, triggering rules based on the received sensor data; and
    the gateway device pushing the updated event triggering rules to the monitoring devices in the different cabinets.

15. The method as claimed in claim 14, wherein the monitored elements include circuit breakers, fuses, switches, lightning arrestors, power bars, junctions, relays, contacts, and/or transformers of the electrical switchgear cabinets.

16. The method as claimed in claim 14, further comprising the monitoring devices generating thermal images representing infrared radiation of the monitored elements via cameras of the monitoring devices.

17. The method as claimed in claim 16, further comprising generating images depicting visual features of the monitored elements overlaid on the thermal images.

18. The method as claimed in claim 16, further comprising the monitoring devices generating temperature information for different regions within fields of view of the cameras via thermopile pixel arrays of the cameras and updating the event triggering rules based on changes to the temperature information for the different regions over time.

19. The method as claimed in claim 14, further comprising generating the updated event triggering rules based on recognized features of the monitored elements depicted in captured image data, and the monitoring devices generating targeted sensor data corresponding to the recognized features of the monitored elements based on the updated event triggering rules.

20. The method as claimed in claim 14, further comprising the gateway device including multiple gateway devices and a cloud management system connected to the gateway devices installed at a plurality of different premises via one or more public networks receiving aggregated event information and/or sensor data from the plurality of gateway devices, generating updated configuration data for the gateway devices based on the aggregated event information and/or sensor data, and pushing the updated event triggering rules to the monitoring devices.

21. The method as claimed in claim 20, further comprising the plurality, of gateway devices sending the event information and/or sensor data to the cloud management system by posting transactions containing the event information and/or sensor data to a distributed ledger and/or blockchain.

22. The method as claimed in claim 14, further comprising the monitoring devices generating average temperature information in a power-saving mode via single-cell thermopiles of the monitoring devices.

23. The method as claimed in claim 14, further comprising the monitoring devices generating ambient, temperature information for an environment within and/or outside the electrical switchgear cabinets via temperature detectors of the monitoring devices and detecting the events based on the ambient temperature information.

24. The method as claimed in claim 14, further comprising the gateway device detects the events based on instantaneous power and/or current levels for the electrical switchgear cabinets.

25. The method as claimed in claim 14, further comprising the monitoring devices temporarily storing the sensor data in circular buffers of the monitoring devices and sending the sensor data for a period of time before the detected events to the gateway device.

26. The method as claimed in claim 25, further comprising the monitoring devices receiving from backup power sources of the monitoring devices sufficient power to store the sensor data from the circular buffers in nonvolatile memory in response to detecting power failures.

* * * * *